United States Patent [19]

Benz et al.

[11] Patent Number: 4,499,765
[45] Date of Patent: Feb. 19, 1985

[54] DEVICE FOR THE DETERMINATION AND/OR CONTROL OF A CERTAIN CHARGING LEVEL IN A CONTAINER

[75] Inventors: Karl Benz, Schiltach; Gunter Kech, Wolfach-Kirnbach, both of Fed. Rep. of Germany

[73] Assignee: VEGA Grieshaber GmbH & Co. KG, Schiltach, Fed. Rep. of Germany

[21] Appl. No.: 459,544

[22] PCT Filed: Sep. 30, 1981

[86] PCT No.: PCT/DE81/00158
  § 371 Date: Jan. 11, 1983
  § 102(e) Date: Jan. 11, 1983

[87] PCT Pub. No.: WO83/01307
  PCT Pub. Date: Apr. 14, 1983

[51] Int. Cl.³ .............................................. G01F 23/28
[52] U.S. Cl. .................................... 73/290 V; 367/908
[58] Field of Search ...................... 73/290 V; 141/198; 367/908

[56] References Cited

U.S. PATENT DOCUMENTS

| 3,246,516 | 4/1966 | Maropis | 73/290 V |
| 3,814,146 | 6/1974 | Mesh | 141/198 X |
| 4,008,613 | 2/1977 | Myers | 73/290 V |
| 4,213,337 | 7/1980 | Langdon | 73/290 V |
| 4,325,416 | 4/1982 | Hermann | 141/95 |
| 4,383,443 | 5/1983 | Langdon | 73/290 V |

FOREIGN PATENT DOCUMENTS

| 2855643 | 12/1978 | Fed. Rep. of Germany ... 73/290 V |
| 0136651 | 7/1979 | Fed. Rep. of Germany ... 73/290 V |
| 2949162 | 12/1979 | Fed. Rep. of Germany ... 73/290 V |
| 3011603 | 3/1980 | Fed. Rep. of Germany ... 73/290 V |

Primary Examiner—Daniel M. Yasich
Attorney, Agent, or Firm—Sughrue, Mion, Zinn, Macpeak and Seas

[57] ABSTRACT

A device for the determination of the charging level in a container has a vibrator on which two torsional vibrators (10, 12) of the same resonance frequency vibrate in an opposite way. The vibration elements (10, 12) are arranged coaxially and have a common center of rotation (20) which is located in the center of a diaphragm (14) serving as a return spring for the outer element (10). The inner element (12) is designed in the shape of a rod and has a tapering (17) in the area of the center of rotation (20) acting as a return spring. Owing to the design according to the invention, a charging level determination is possible with goods charged of a high and of a low density whereby the detection sensitivity is almost independent of the clamping conditions of the vibrator.

6 Claims, 2 Drawing Figures

DEVICE FOR THE DETERMINATION AND/OR CONTROL OF A CERTAIN CHARGING LEVEL IN A CONTAINER

BACKGROUND OF THE INVENTION

The invention refers to a device for the determination and/or control of a certain charging level of a material charged into a container. The device employs a vibration structure having two torsional vibrators of the same resonance frequency with vibration elements arranged in the opposite sense of rotation, arranged coaxially and enveloping each other at a distance from each other. The vibration structure has its vibrations damped by the outer vibration element enveloping the inner vibration element when contacting the charged material. Systems are provided to trigger indicating and/or switching processes as a function of the amplitude of the vibrations.

Devices of this kind are known. The effect is utilized that vibration energy is transferred from the vibration structure to the material charged by means of impulse transfer whereby the vibration structure which is stimulated towards vibrating is exposed to a damping effect.

Devices are known from the German Patent No. 582 760 and from the British Patent No. 10 13 186 in which a vibration rod excited to perform flexural vibrations at is resonance frequency projects into a container to be monitored and its vibrations are exposed to a damping effect when contacting the material charged so that the charging level is indicated by means of the change in vibrations.

However, these charging level measuring devices have the disadvantage that the single vibration rod exerts considerable alternating forces on the clamping system and thus on the container wall so that vibration energy is transferred from the vibration rod to the container wall. Owing to these losses, the vibration driving system must be designed with a high output in order to maintain vibrations. This, in its turn, has the effect that the vibration structure, when immersed in light weight bulk goods having a slight damping capability, is no longer sufficiently damped. An exact monitoring is, thus, not quite possible.

Therefore, a proposal was submitted having, instead of one vibration rod, two vibration rods, arranged in parallel next to each other, and projecting into the container, which are connected to each other by a crossbar at the clamping point and can be made to have opposing flexural vibrations (German Disclosure Publication No. 17 73 815). Besides the considerably greater structural complexity in comparison with the measuring devices for a single vibration rod, the device designed as a tuning fork has the disadvantage that powder-like or fiber-like goods to be charged can get caught between the vibration rods or grain can deposit there so that a damping of the vibration structure is effected even though the charging level is low.

Therefore, proposals have been submitted to provide vibration structures with two vibration elements arranged on top of each other which are designed as torsional vibrators having the same resonance frequency and are excited to perform vibrations in an opposite sense of rotation in order to determine the charging level. For this purpose, the vibration elements arranged coaxially towards each other can partially envelope each other for a distance.

Through a corresponding arrangement, advantages have been achieved to permit an exceedingly precise monitoring of the charging level in a container without transferring vibration energy to the container wall without requiring a complex structure.

SUMMARY OF THE INVENTION

It is the task of the present invention to design a device of the aforementioned kind in such a way that it is possible to use the same for the determination of the charging level of almost any goods charged—i.e. of a high or low density—and that the detection sensitivity is almost independent of the clamping conditions of the vibration structure.

The task is accomplished according to the invention in that the coaxially arranged vibration elements have a common center of rotation which is in the center of a diaphragm serving as a return spring for the outer vibration element whereby the inner vibration element is designed in the shape of a rod and has a tapering in the area of the center of rotation acting as a return spring.

The vibration elements have equally large masses and a common mass center. Furthermore, the spring forces arising from the diaphragm and from the tapering are each adjusted in such a fashion that the torsional moments caused by the vibration elements around the center of rotation eliminate each other.

As a further development of the invention, the outer vibration element is designed in the shape of a tube, at least in that area in which the inner vibration element is enveloped while it has preferably the shape of a paddle at the outer side of its free end in order to obtain higher measuring precision. The diaphragm for the outer vibration element as well as at least the section above the tapering of the inner vibration element are rigidly connected to the container casing.

The drive of the vibration structure as well as the pick-up of the vibration amplitude are preferably effected by means of electromechanical converters in the form of piezoelectric elements which are fastened diametrically towards each other on the diaphragm.

According to the invention, among others, an advantage is obtained in that an automatic adjustment is effected of the counter-vibration moment exerted by the inner vibration element to the characteristics of the container wall which results in the mentioned independence of the clamping conditions which leads to an increase in the detection sensitivity. It should also be mentioned that the device according to the invention is characterized by a simple and robust structure.

If, in accordance with the state of the art, an attempt is made with charging level measuring devices using two vibration elements to avoid or to minimize the transfer of vibration energy to the container wall, the present invention is based on other considerations. There are two limit conditions each with a different physical prerequisite. The practical use of the device according to the invention will take place between these two extremes. In one extreme case, the vibration structure is screwed into a container wall with a mass and rigidity considered to be infinite. In this case, the desired quality of the outer vibration element to be damped by the goods charged is not impaired by the characteristics of the container wall. In other words, the inner vibration element which would have to produce a counter-moment is superfluous since the diaphragm acting as an elastic element is supported in a completely rigid manner. In the other limit condition, the vibration structure is considered to be suspended in space in an infinitely elastic and free manner so that the inner vibration element must produce a vibration moment of equal size but acting oppositely to that of the outer one so that the area into which the vibration structure is screwed into the container wall remains in its resting position. When this occurs, a high quality condition is also given.

In practice, conditions for screwing the device according to the invention into the container wall will develop in which the device according to the invention will be partially supported in the container wall and partially by the counter-moment of the inner vibration structure. Owing to the characteristics of the device according to the invention, it is now possible that, while maintaining an always equally good detection sensitivity, an automatic adjustment is effected to the respectively existing practical conditions.

BRIEF DESCRIPTION OF THE DRAWINGS

Further details, advantages and features of the invention will be apparent from the following description of the drawings in which.

DETAILED DESCRIPTION OF THE PREFERRED EMBODIMENTS

Figure 1:
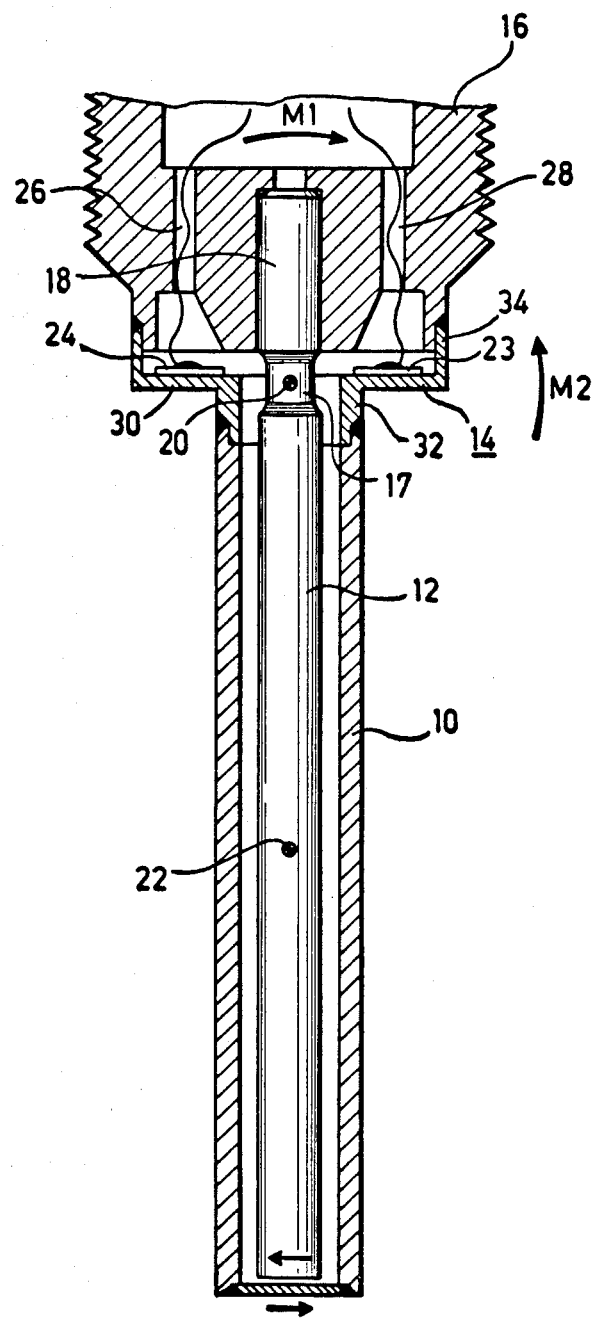
FIG. 1 is a first exemplary embodiment.

In FIG. 1, a cross-sectional presentation of a first exemplary embodiment is shown of a device according to the invention for the determination and/or control of a certain charging level in a container, which consists of two vibration elements 10 and 12 which are arranged coaxially and envelop each other at least partially. The outer vibration element 10 in the embodiment is designed in the shape of a tube in the area of the inner vibration element 12 and the inner vibration element 12 is designed in the shape of a rod. The free end of the vibration element 10 not enveloping the inner vibration element 12 is preferably squeezed flat—that is, however, not shown—in order to be given the shape of a paddle. This results in a higher sensitivity in the monitoring of the charging level.

The outer vibration element 10 is connected at an upper free end with a diaphragm 14 acting as a return spring which, in turn, is rigidly connected to a screw part 16 on a container wall. While the diaphragm 14 has the function of a return spring for the vibration element 10, a tapering 17 in the upper section of the inner vibration element 12 has the same effect. As is clearly shown in FIG. 1, the tapering 17 is arranged at the level of the diaphragm 14. Above the tapering 17, the upper section 18 of the vibration element 12 is rigidly connected to the screw part 16. The rod-like vibration element 12 and the tube-like vibration element 10 are designed in such a way that they have a common center of rotation 20 which is located at the center of the diaphragm 14 and thus also on the coinciding main axes of the vibration elements 10 and 12. Furthermore, the vibration elements 10 and 12 have equally large masses and a common mass center 22. The diaphragm 14 and the tapering 17 are, as to their spring force, adjusted towards each other in such a manner that the torsional moments M 1 and M 2 produced by the outer vibration element 10 and the inner vibration element 12, i.e. the rod and the tube, around the center of rotation 20 eliminate each other.

In this way, it is guaranteed that the two vibration elements 10 and 12 vibrate with the same resonance frequency. An electromechanical converter serves as the driving system in the form of a piezoelectric element 24 which is excited by means of a direct voltage pulsating at the resonance frequency of the vibration structure. The piezoelectric element 24 is arranged on one side of the diaphragm 14. The pulsating expansion in the radial direction of the piezoelectric element has the effect that the same expansion takes place on the corresponding side of the diaphragm whereby the tube or the outer vibration element 10 is made to vibrate. When vibration energy is led off through the screw part 16, it is transferred to the rod-like inner vibration element 12 which, as a result, vibrates in the opposite sense of rotation with respect to the outer vibration element 10. This occurs when the screw part 16 or the container wall, respectively, are not to be considered as infinitely rigid and mass-encumbered. The inner vibration element 12 would, on the other hand, remain at rest with an infinitely large mass.

The detection is also effected with the help of an electro-mechanical converter in the form of a piezoelectric element 23 which is arranged diametrically to the piezoelectric element 24 on the opposite side of the diaphragm 14. The expansion of the diaphragm 14 and of the piezoelectric element 23 fastened on the latter which is caused by the vibration produces in said piezoelectric element 23 a pulsating direct voltage which disappears when the system is damped through the contact of the outer vibration element 10 with the charged material. This then triggers indicating or switching processes by means of systems which are not shown. Connections between the piezoelectric element 23 or 24 with an amplifier or subsequently connected threshold discriminators and relays for indicating or switching processes are guided through boreholes 26 and 28 in the screw part 16.

According to the embodiment of FIG. 1, the diaphragm 14 is formed by a basic surface 30 which runs vertically to the vibration element axes and from which two cylindrical sections of different diameters project in opposite directions, one of which, 32, is connected with the tube-shaped outer vibration element 10 and preferably passes over into it in an aligned manner while the other section 34 is connected with the screw part 16 preferably in the form of a cylindrical projection.

Figure 2:
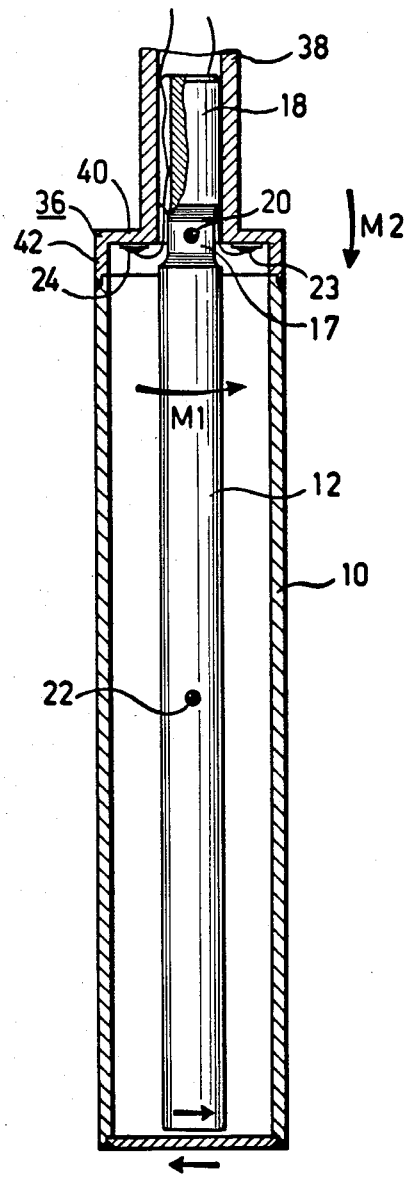
FIG. 2 is a second exemplary embodiment of the device according to the invention.

The embodiment according to FIG. 2 deviates from that of FIG. 1 with regard to the design of the diaphragm 36 and the screw part 38. Apart from that, the other elements are designed in the same fashion and the same reference symbols are used as in FIG. 1. A detailed description is thus superfluous.

The diaphragm 36 according to FIG. 2 has also a basic surface 40 running vertically to the vibration element axes which is directly and rigidly connected with the screw part 38. The connection between the diaphragm 36 and the outer vibration element 10 is also effected by means of a cylindrical section 42 projecting from the basic surface 40 as in the case of FIG. 1, and the section 42 passes over into the tube-shaped vibration element 10 in an aligned fashion. The execution of the electrical connection lines between the piezoelectric elements 23 and 24 and the indicating and evaluating systems (not shown) is effected, according to the embodiment of FIG. 2, through the upper section 18 of the inner rod-shaped vibration element 12 located above the tapering 17. Furthermore, the free end of the outer vibration element 10 of the exemplified embodiment according to FIG. 2 is preferably designed in the shape of a paddle, but is not shown in the drawing.

We claim:

1. An apparatus for determining the filling level of a material in a container, comprising:
    a vibration structure including inner and outer vibration elements which vibrate at the same resonant frequency in opposing directions, said elements being arranged coaxially to each other, at least one of said elements being set in the center of a membrane which acts as a return spring,
    the vibrations of the outer one of said elements being muffled when the material in the container touches the same, said outer vibration element surrounding the inner vibration element,
    said vibration elements (10, 12) having a common pivotal point (20),
    said pivotal point (20) being situated in the center of said membrane (14) which serves as the return spring for the outer vibration element,
    said inner vibration element being rod-shaped (12) and having, in the region of the pivotal point (20), a tapered area (17) that serves as a return spring therefor.

2. A device according to claim 1, wherein said vibration elements (10, 12) have the same mass and a common center of gravity (22) which moves on a common radius.

3. A device according to claim 1, wherein the spring resistances of the membrane (14) and the tapered area (17) eliminate the torque on the vibration elements about the pivotal point (20).

4. A device according to claim 1, including means for driving the vibration structure as well as registering the vibration amplitude comprising electromechanical transformers in the form of piezoelectric elements (23, 24) which are attached to said membrane, diametrically to each other.

5. A device according to claim 1, wherein said outer vibration element (10) is arranged in the shape of a tube, at least in the area thereof surrounding the inner vibration element (12) and includes a paddle shaped portion at its free end.

6. A device according to claim 1, wherein said membrane (14) and at least that part (18) of the inner vibration element (12) above the tapered area (17) is firmly connected to the container by means of a screwed socket (16, 38).

* * * * *